(12) United States Patent
Christman et al.

(10) Patent No.: US 8,820,035 B2
(45) Date of Patent: Sep. 2, 2014

(54) INTERCHANGEABLE CUTTING ELEMENTS FOR SEALING MACHINE

(75) Inventors: Russell Christman, Dunstable, MA (US); Thomas Orsini, Leominster, MA (US); Todd Brown, Arlington, MA (US); Robert Simonelli, Worcester, MA (US)

(73) Assignee: Shanklin Corporation, Ayer, MA (US)

( * ) Notice: Subject to any disclaimer, the term of this patent is extended or adjusted under 35 U.S.C. 154(b) by 613 days.

(21) Appl. No.: 13/195,132

(22) Filed: Aug. 1, 2011

(65) Prior Publication Data

US 2013/0031870 A1 Feb. 7, 2013

(51) Int. Cl.
*B29C 65/02* (2006.01)

(52) U.S. Cl.
USPC ............ 53/375.9; 53/456; 53/477; 53/550; 53/562

(58) Field of Classification Search
USPC .......... 53/450, 455, 456, 477, 545, 550, 562, 53/375.8, 375.9, 376.2
IPC ............... B29C 65/00,65/02, 66/1122, 66/849, B29C 65/18, 65/7873
See application file for complete search history.

(56) References Cited

U.S. PATENT DOCUMENTS

| | | | |
|---|---|---|---|
| 3,765,990 A | 10/1973 | Histed et al. | |
| 3,925,139 A * | 12/1975 | Simmons | 156/358 |
| 4,219,988 A | 9/1980 | Shanklin et al. | |
| 4,608,797 A | 9/1986 | Shabram, Jr. et al. | |
| 4,613,746 A | 9/1986 | MacLaughlin | |
| 4,722,168 A | 2/1988 | Heaney | |
| 5,417,041 A * | 5/1995 | Hansen et al. | 53/550 |
| 5,603,801 A | 2/1997 | DeFriese et al. | |
| 6,027,596 A * | 2/2000 | DeFriese et al. | 156/251 |
| 6,526,728 B1 | 3/2003 | Sorenson et al. | |
| 7,281,362 B2 | 10/2007 | James et al. | |
| 7,411,162 B2 * | 8/2008 | Kalinowski et al. | 219/486 |
| 7,637,299 B2 | 12/2009 | King, Jr. et al. | |
| 7,685,795 B2 | 3/2010 | King, Jr. et al. | |
| 2003/0129373 A1 | 7/2003 | Migliorini et al. | |
| 2006/0091127 A1 * | 5/2006 | Kalinowski | 219/241 |
| 2006/0107622 A1 | 5/2006 | James et al. | |
| 2007/0006973 A1 | 1/2007 | King, Jr. et al. | |
| 2011/0072764 A1 * | 3/2011 | Daniek et al. | 53/556 |
| 2013/0032295 A1 | 2/2013 | Christman et al. | |
| 2013/0059708 A1 * | 3/2013 | White et al. | 493/186 |

OTHER PUBLICATIONS

International Search Report and Written Opinion mailed Jul. 6, 2012 in corresponding PCT case No. PCT/US2012/035404.
International Search Report and Written Opinion mailed Jul. 10, 2012 in co-pending PCT case No. PCT/US2012/035353.

* cited by examiner

*Primary Examiner* — Christopher Harmon
(74) *Attorney, Agent, or Firm* — Nields, Lemack & Frame, LLC

(57) ABSTRACT

A sealing machine adapted to support a plurality of different heating/sealing/cutting mechanisms, including tubular heaters and heated cutting blades, is disclosed. The sealing machine utilizes a common interface and mounting system for all side sealers. In addition, in some embodiments, the control system within the sealing machine is adapted to monitor and control the temperature of these various mechanisms automatically so as to create proper seals.

12 Claims, 12 Drawing Sheets

A

B

INTERCHANGEABLE CUTTING ELEMENTS FOR SEALING MACHINE

BACKGROUND OF THE INVENTION

Machines used to wrap and seal articles and packages in thermoplastic film are well known in the art. Two types of machines are commonly referred to as side-sealing and lap-sealing machines. In the typical side-sealing configuration, an article or set of articles travels, typically via a conveyer belt, toward the machine. A sheet of center-folded plastic film, having two layers, is fed from a direction, which is preferably perpendicular to the direction of the conveyer. The two layers of the film are then separated such that the article is placed between the lower layer and the upper layer. On one side of the article is the center-fold, while on the other side, there is an open edge where the two layers are not attached. The machine has several sets of belts to hold and guide the film, and a side sealing mechanism, which typically comprises a heating/sealing element that fuses or welds the two layers together and a cutting element that removes the excess material. In some embodiments, the heating element serves to cut the film as well. These elements, whether a unitary element or separate components, are referred to as the heating/sealing/cutting element throughout this disclosure. Thus, as the article passes by the side sealing mechanism, this open edge is sealed by welding the two layers together, the plastic is cut and the waste is removed and discarded. At this point, the plastic film resembles a tube, with openings at both the leading and trailing ends of the article, but sealed along both sides. As the article continues to advance, an end sealing mechanism is then employed to seal the film at the leading end of the article. The article is then advanced and the end sealing mechanism then seals the film at the trailing end of the article.

Incomplete, inconsistent or sloppy welds can be problematic with these types of machines. The choice of heating/sealing/cutting element, film thickness and film speed are all factors in determining the quality of the seal. It is possible that different types of side sealing mechanisms may optimize seals for certain configurations. For example, tubular heating elements may optimize seals for high speed and/or thick films, while heated cutting blades may optimize lower speed and/or thinner films.

However, heated cutting knives and tubular heating elements currently require different side sealing machines. Purchase of two different machines with different side sealing mechanisms may be costly and not practical. Thus, customers are often forced to select one of the two technologies, knowing that their selection is not optimal for certain film speeds and thicknesses.

Therefore, a single side sealing machine that can be used with modular heating/sealing/cutting mechanisms, including heated cutting blades, tubular heating elements and other heating and cutting elements, would be beneficial.

SUMMARY OF THE INVENTION

The problems associated with the prior art have been overcome by the present invention, which describes a sealing machine adapted to support a plurality of different heating/sealing/cutting mechanisms, including tubular heaters and heated cutting blades. The sealing machine utilizes a common interface and mounting system for all side sealers. In addition, in some embodiments, the control system within the sealing machine is adapted to monitor and control the temperature of these various mechanisms automatically so as to create proper seals.

DETAILED DESCRIPTION OF THE INVENTION

Figure 1:
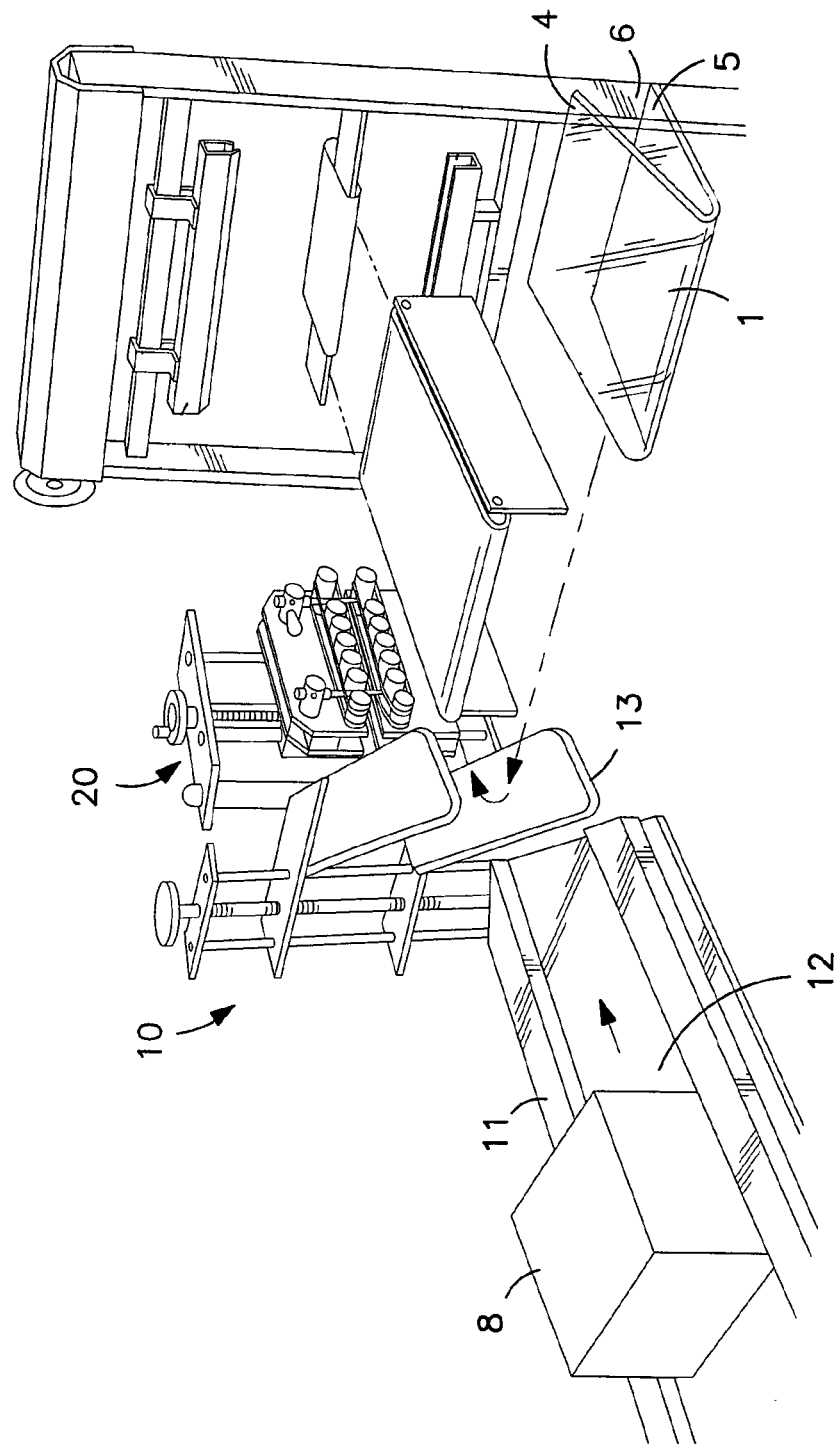
FIG. 1 illustrates a representative side-sealing machine of the prior art.

FIG. 1 illustrates a representative side-sealing machine used to encapsulate or wrap an article in thermoplastic film, as described in U.S. Pat. No. 6,526,728. The machine 10 utilizes a conveyer belt 12 operating at a relatively constant speed to deliver articles 8 that are to be encapsulated. The thermoplastic film 1 is center-folded, such that the side with the fold is closed, while the opposite side 6 is open. On this opposite side, there are two layers of film 4,5, which will later be sealed. This center-folded thermoplastic film 1 is fed from a reel (not shown) that is preferably mounted such that the film is fed perpendicular to the direction of travel of the conveyer belt 12. The film is then inverted and separated by an inverter 13 such that the article is enveloped between the two layers 4,5. At this point, the film 1 on one side of the article is closed, while the opposite side 6 remains open. Also, the film at both the leading and trailing ends of the article are not sealed. Downstream from the inverter is the side-sealing mechanism 20. After proper relative positioning of the article between the layers of the film 4,5, the enveloped article approaches the side-sealing mechanism 20.

The side-sealing mechanism 20 is located on the open side 6 of the enveloped article. The mechanism holds the two layers of film 4,5 together, and guides the layers through the heating and cutting means. It then welds the two layers together, and cuts off the surplus material. The surplus material is pulled away so as not to reattach to the film while it is still at an elevated temperature.

FIG. 2A shows a side sealing mechanism 20, with its cover in place. FIG. 2B shows the mechanism 20 with this cover removed. As shown in FIG. 2B, to perform these actions, the mechanism 20 preferably comprises two sets of cooperating pulleys, an upper set 101 and a lower set 102. These sets work in unison to pull the two layers of film into the mechanism and hold the layers in place. In the preferred embodiment, each of the pulleys has teeth 110 in its channel so as to accept one or more, preferably two, timing belts 120. The presence of teeth 110 ensures that the timing belt does not slip relative to the pulleys. However, V belts can also be utilized with this invention, as well. The first set of pulleys 101 is located above the layers of film, while the second set 102 is located below the layers. Each set comprises a drive pulley 101a, 102a and a tail pulley 101b, 102b. There may optionally be one or more idler pulleys (not shown). Each of these pulleys also has one or more, preferably two, O-rings mounted in the channel where the belts are located, so as to provide individual channels for each of the timing belts.

Each of the timing belts preferably has a special gripping outer surface, that is bonded to a truly endless steel or Kevlar reinforced timing belt. Each corresponding set of belts has upper and lower pressure plates that are preset to insure good contact between the pair of belts.

Figure 3:
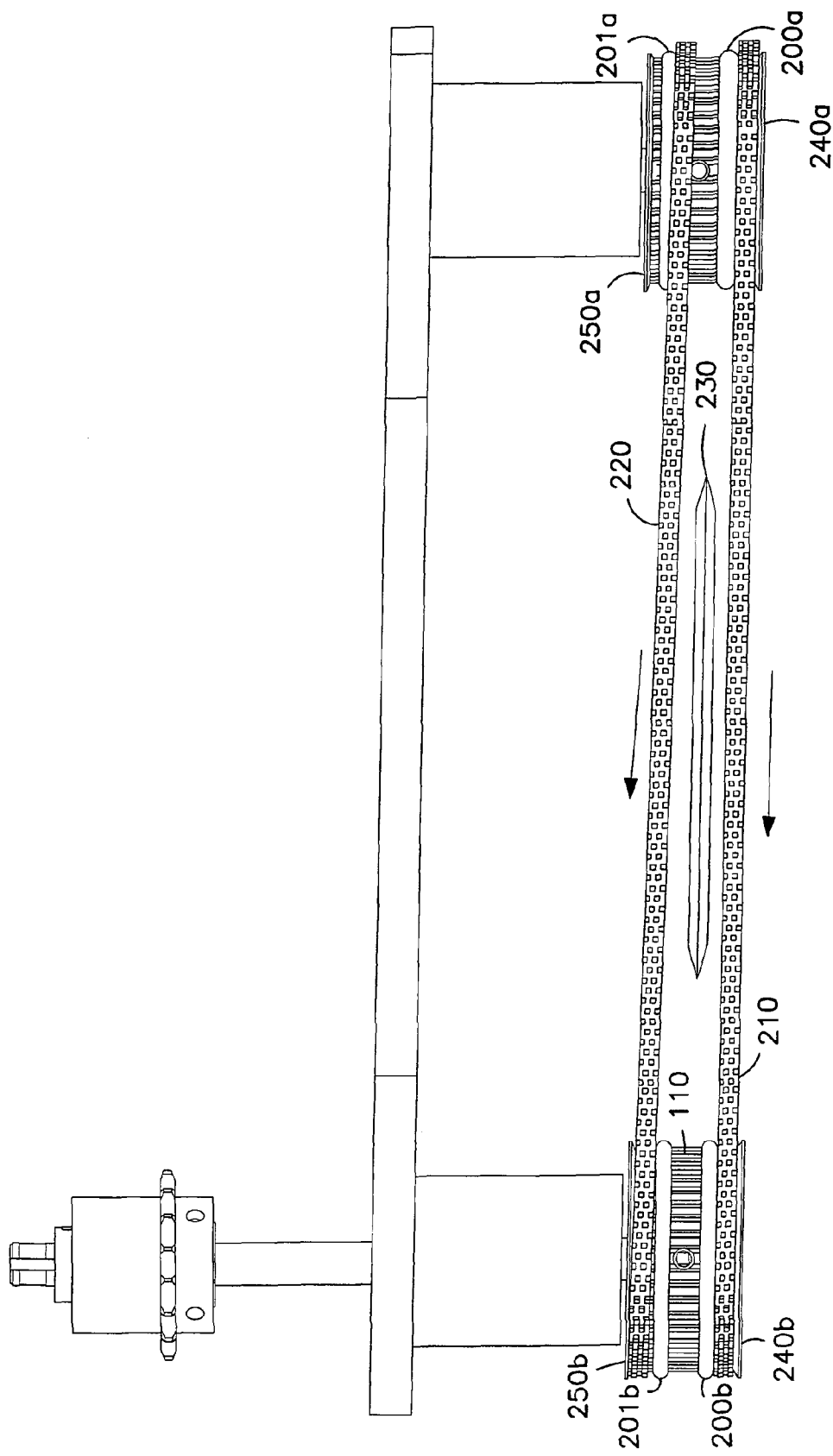
FIG. 3 illustrates a top view of the side-sealing mechanism shown in FIG. 2.

In one embodiment, as shown in FIG. 3, one set of O-rings 200 is positioned such that the movement of the outermost belt 210 is made to be parallel to the direction of the film movement. The outer wall of the pulley 240 and this first set of O-rings 200 provide the guides for the outermost belt 210. As shown in FIG. 3, O-ring 200a and O-ring 200b are equidistant from the outer wall of their respective pulleys. A second set of O-rings 201 is used to guide the innermost belt 220 in a path that diverges away from the direction of the film and the outermost belt. This can be accomplished in a number of ways. For example, a combination of one O-ring and the inner wall of the downstream pulley 250b can be used to define the channel for the innermost belt 220, as shown in FIG. 3. Similarly, two O-rings may be inserted on the upstream pulley to define a channel for the innermost belt. Alternatively, a single O-ring 201a, as shown in FIG. 3, can be used to define the inner wall of the channel for the innermost belt 220. Because of the divergence angle, there are no forces pushing the innermost belt 220 toward the outermost belt 210, thus the second O-ring may be eliminated. In other words, in the channel associated with the upstream pulley 240a, the O-ring 201a provides the inner guide for the belt 220. In the channel associated with the downstream pulley 240b, the O-ring 201b provides the outer guide for the belt 220. As a result, the innermost belt 220 is closest to the outermost belt 210 at the upstream pulley, and farthest away from it at the downstream pulley. The heating/sealing/cutting element 230 is preferably located between the upstream and downstream pulleys. Thus, as the film passes the upstream pulley, it is still intact; however, it is cut before it reaches the downstream pulley. By introducing this divergence angle, the innermost belt 220 helps guide the unwanted surplus away from the film after it is cut. In the preferred embodiment, the innermost belt 220 is guided in the channel of the downstream pulley a distance further away from the film than on the upstream pulley sufficient to force the surplus plastic away from the film. One such suitable distance is about ¼ inch. This ensures that the surplus material does not reattach itself to the film while still at an elevated temperature. This surplus material is then held under tension and fed into a reel, which is later discarded. While the use of multiple belts, with a divergence between them is preferred, the use of a single belt, or multiple parallel belts is also within the scope of the present invention.

The side-sealing mechanism 20 also includes the heating/sealing element and the cutting element. As described above, these elements are preferably located between the upstream and downstream pulleys, so that they can seal and cut the film before it is separated by the downstream pulley. In some embodiments, the heating/sealing element and the cutting element are an integral component, such as a heated cutting blade or a tubular heater. In other embodiments, these two functions may be performed by separate components. Throughout this disclosure, the term heating/sealing/cutting element will be used to describe both configurations.

Figure 4:
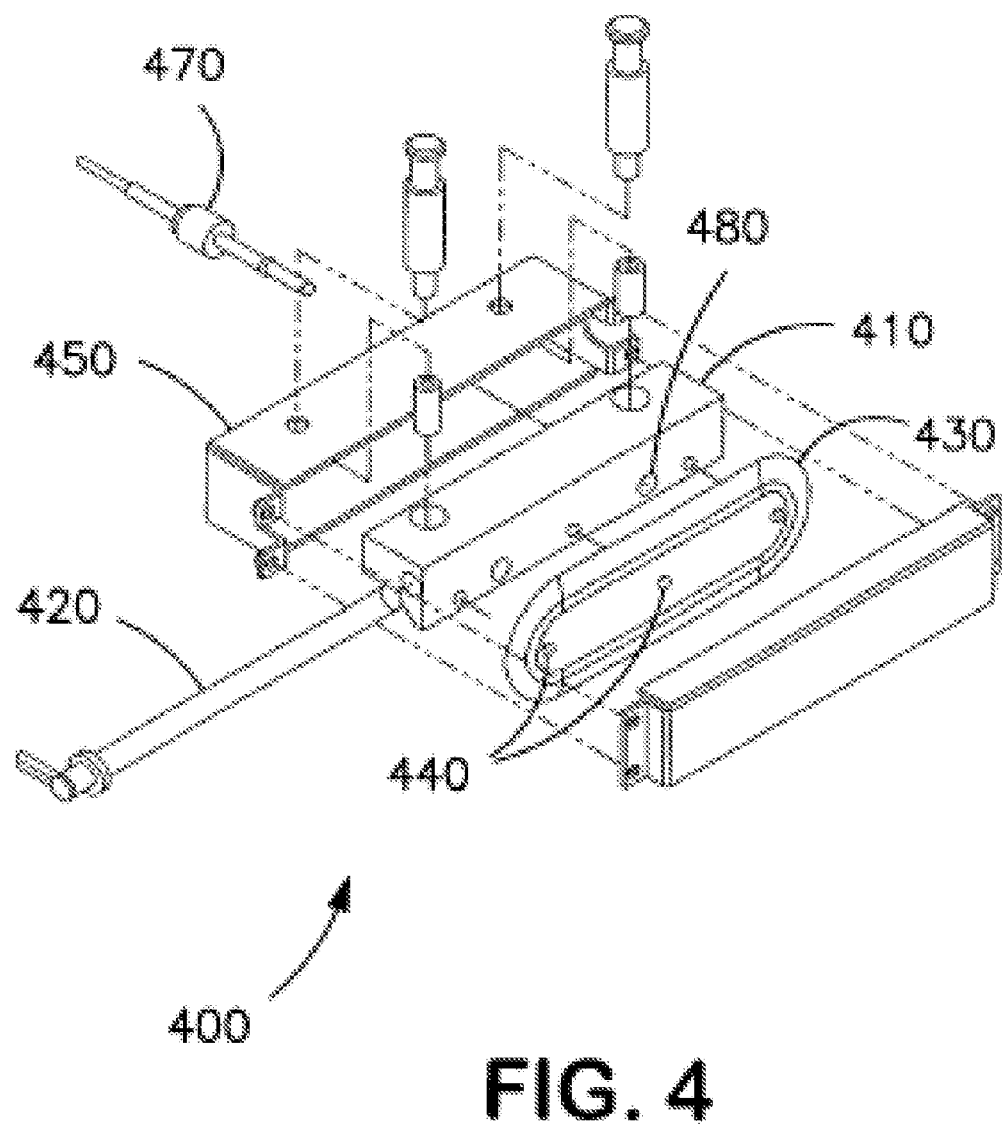
FIG. 4 illustrates an exploded view of the cutting element and associated heater block assembly.

As described above, different types of heating/sealing/cutting elements may be used with side sealing mechanisms. One such heating/sealing/cutting element is a heated cutting blade, as shown in FIG. 4. The heater block assembly 400 comprises a heater block 410, which preferably contains a cartridge style heater 420. This heater block 410 is constructed of a heat conductive material, preferably copper. The cutting element 430 is mounted to the heater block 410, allowing it to be in good thermal contact with the heater block 410 so that it may be heated directly by the heater block 410. In the preferred embodiment, the cutting element 430 may be oval shaped, with the mounting holes 440 positioned such that it can be installed in any of four possible mounting orientations. The cutting element is preferably roughly 6 inches long and 2-3 inches high. To produce a satisfactory seal, the cutting element is preferably maintained at a temperature between 300° and 800° F. The speed at which the film passes the cutting element is useful in determining the optimal temperature of the cutting element 430. For example, as the film speed increases, the optimal temperature of the cutting element 430 increases as well. The heater block 410 and cutting element 430 are encased in an insulating block 450 such that only the lower portion of the cutting element 430 is exposed. The insulating block 450 is used to envelop the heater block 410 and cutting element 430 so as to concentrate and localize the heat.

A temperature sensing probe 470 is used to monitor the temperature of the cutting element 430. In the preferred embodiment, a hole 480 is bored through the heater block 410, and the temperature sensing probe 470 is placed within this hole 480. To ensure satisfactory contact between the temperature sensing probe 470 and the cutting element 430, the temperature sensing probe 470 is preferably spring loaded, such that it is biased toward the cutting element 430. The temperature of the cutting element 430 can thus be monitored and the energy supplied to the heater block 410 can be adjusted in response to the monitored temperature. By measuring the temperature of the cutting element 430 directly, the thermal lag and uncertainty associated with monitoring the temperature of the heater block 410 is eliminated.

Thus, the cartridge style heater 420 receives power from a controller (not shown), while the temperature sensing probe 470 provides feedback to the controller. Thus, by monitoring the feedback from the temperature probe 470, the controller may accurately control the temperature of the cutting element 430. In this embodiment, feedback from the temperature sensing probe 470 is in the form of an analog voltage, where the received voltage is related to the measured temperature. In other embodiments, the feedback may be in the form of a current, or a digital value. The power from the controller to the cartridge style heater 420 may be a constant voltage with a variable current. In other embodiments, the power may be a variable voltage output. Finally, a digital value may be passed to the heater, which converts this to a corresponding power level.

Figure 2:
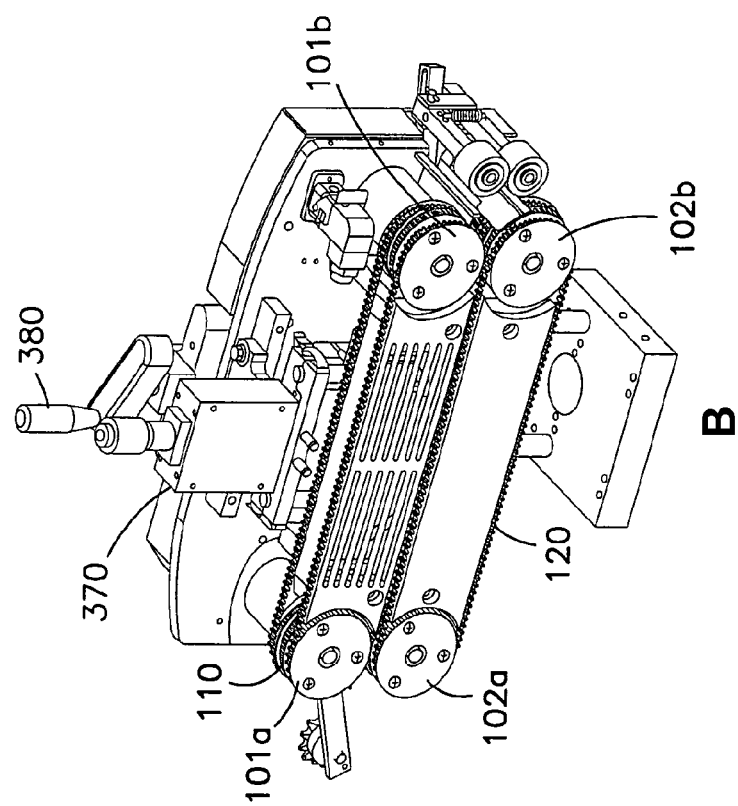
FIG. 2 illustrates two views of the side-sealing mechanism in accordance with the present invention.
Figure 2:
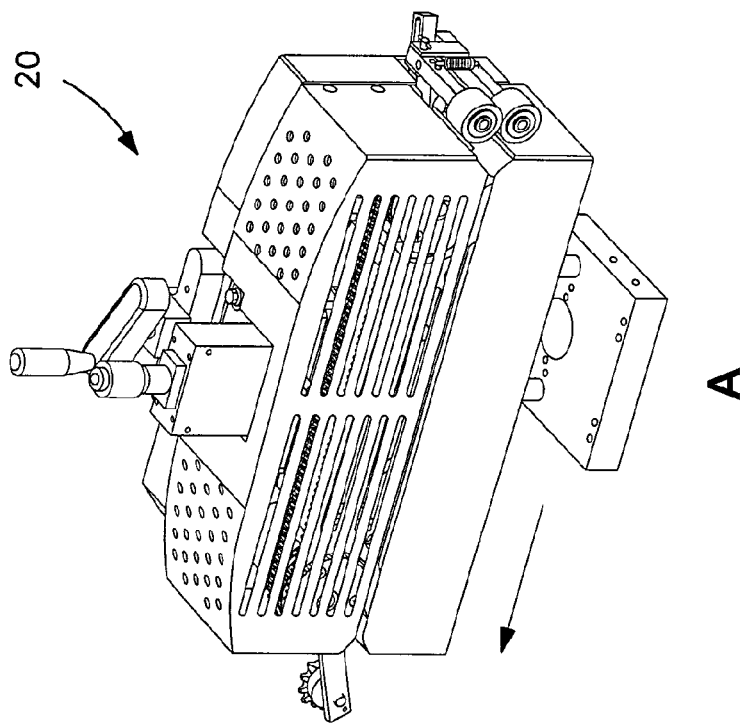

As described above, the temperature probe 470, cutting element 430, heater block 410 and insulating box 450 comprise the heater block assembly 400. This heater block assembly 400 is mounted to a retractable platform, such that it can be moved away from the film when the machine has stopped. In the preferred embodiment, the heater block assembly 400 is mounted to an adjustable platform 370, as shown in FIG. 2. This adjustable platform 370 preferably comprises an air cylinder with guide rods and may include a manually adjustable stroke-limiting device 380. Alternatively, the adjustable platform can be a basic motor, a servo motor or stepper motor, or can be pneumatically or hydraulically controlled. The adjustable stroke enables the operator to reposition the blade 430 with respect to the film during sealing, thereby changing the portion of the blade in contact with the film. By repositioning the blade, the operator can improve the seal quality, which can be degraded by film build-up or contamination of the portion of the blade in contact with the film. This technique can be used several times on each of the four sealing edges of the blade, thus greatly extending the life of the blade.

The side sealing mechanism 20 includes two portions, a modular heating/sealing/cutting assembly 500, and a universal side mechanism 21.

Figure 5A:
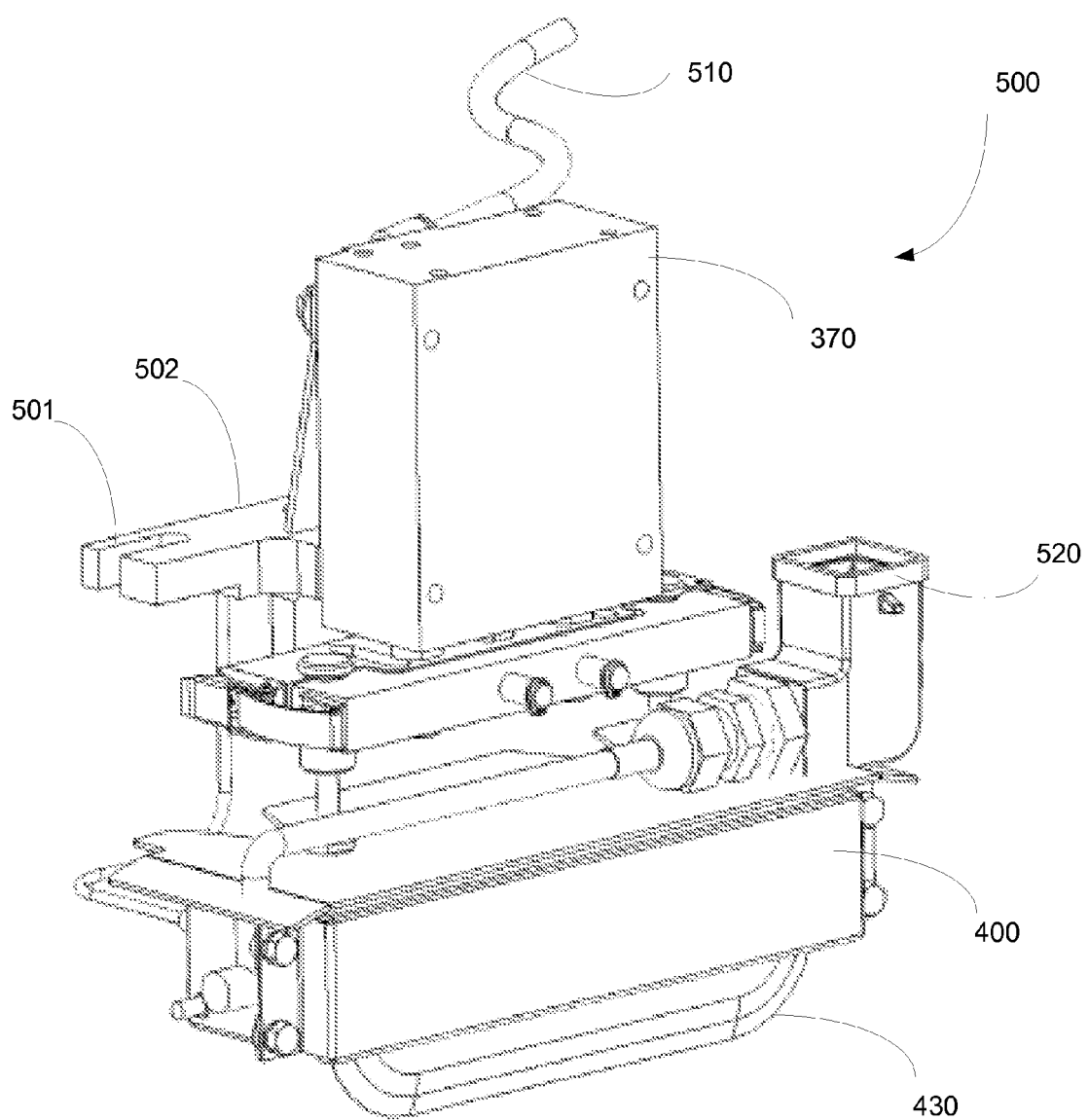
FIG. 5A illustrates a front view of an embodiment including a heated cutting blade assembly and the adjustable platform.
Figure 5B:
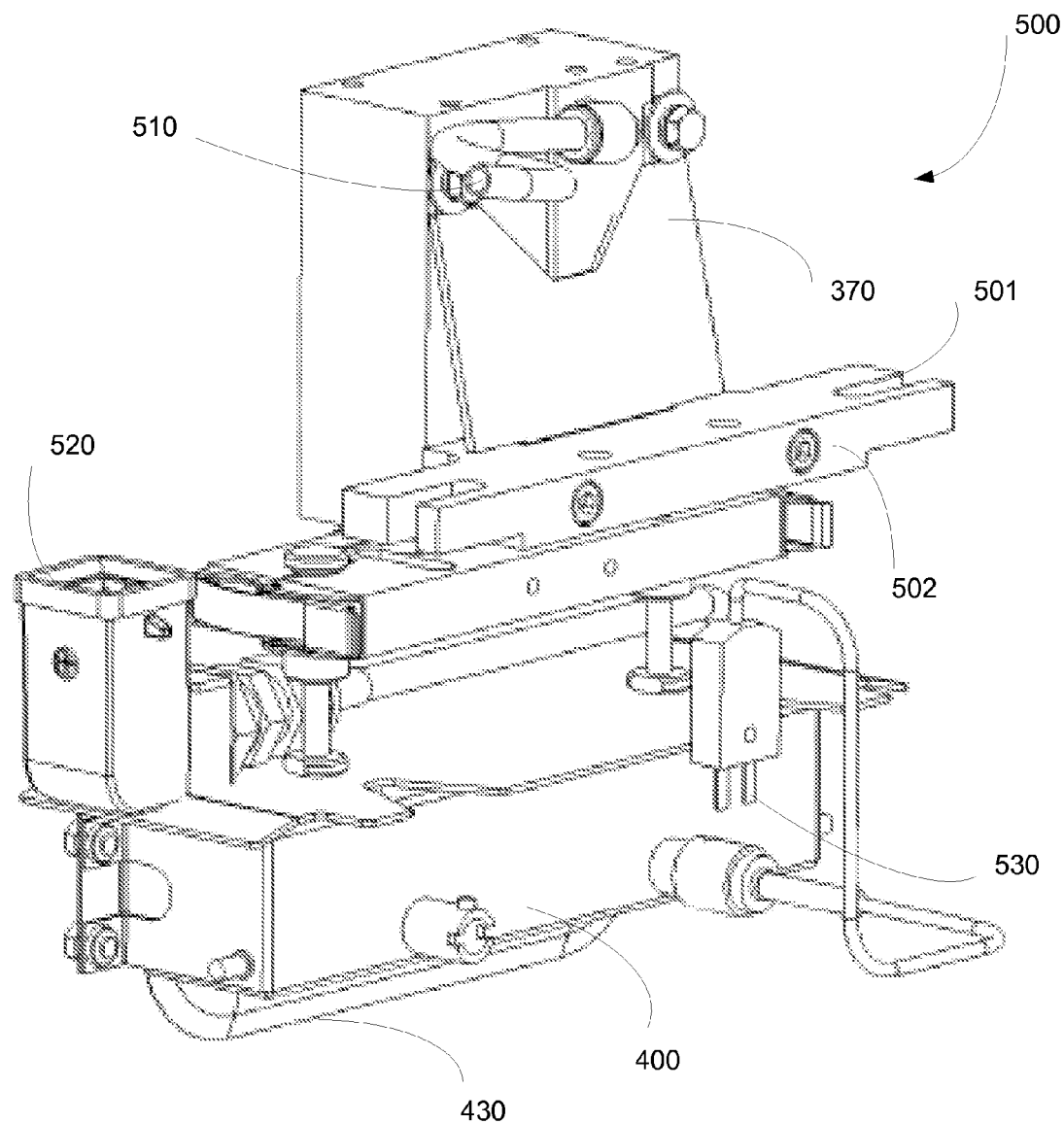
FIG. 5B illustrates a rear view of an embodiment including a heated cutting blade assembly and the adjustable platform.

FIG. 5A shows a front view of a modular heating/sealing/cutting assembly 500 using the heated cutting blade 430 of FIG. 4, while FIG. 5B shows a rear view. In one embodiment, the adjustable platform 370 is attached to the universal side mechanism 21 (see FIG. 10) using two connecting elements, such as bolts, thumb screws or captive members. These connecting devices hold the modular heating/sealing/cutting assembly 500 via one or more mounting ports 501. The mounting ports 501 may be part of a mounting bracket 502, to which the rest of the heating/sealing/cutting mechanism 500 attaches. In another embodiment, a different mounting mechanism is used. For example, the heating/sealing/cutting assembly 500 may plug into a receptacle on the universal side mechanism 21. Other attachment mechanisms are also possible. Therefore, although the specification describes a mounting bracket 502 and mounting ports 501, other embodiments are also within the scope of the invention. The term "mounting mechanism" as used in this specification is used to describe all mounting configurations, not only the mounting bracket 502 shown in FIG. 5A.

Returning to FIG. 5A, the adjustable platform 370 is rigidly attached to the mounting bracket 502. When the air cylinder within the adjustable platform 370 expands, one or more guide rods (not shown) extend downward from the bottom of the adjustable platform 370. The heater block assembly 400 is attached to these guide rods on adjustable platform 370. The air cylinder is controlled through the introduction and removal of compressed air via the air duct 510. Thus, as air is introduced to the adjustable platform 370, the heater block assembly 400 is brought closer to the film. Conversely, as air is released from the adjustable platform 370, the heater block assembly 400 moves away from the film. An air supply is coupled to the adjustable platform 370 via air duct 510. Power is provided to the cartridge style heater 420 via connector 520. The temperature sensing probe 470 is coupled to the sealing machine 10 via a feedback connector 530 (FIG. 5B).

To attach or remove the modular heating/sealing/cutting assembly 500 from the universal sealing mechanism 21, one simply removes the connecting elements from the mounting ports 501, and disconnects the various connectors, including power connector 520, feedback connector 530 and air duct 510. In other embodiments, the mounting mechanism is disconnected from the universal side mechanism 21.

Figure 10:
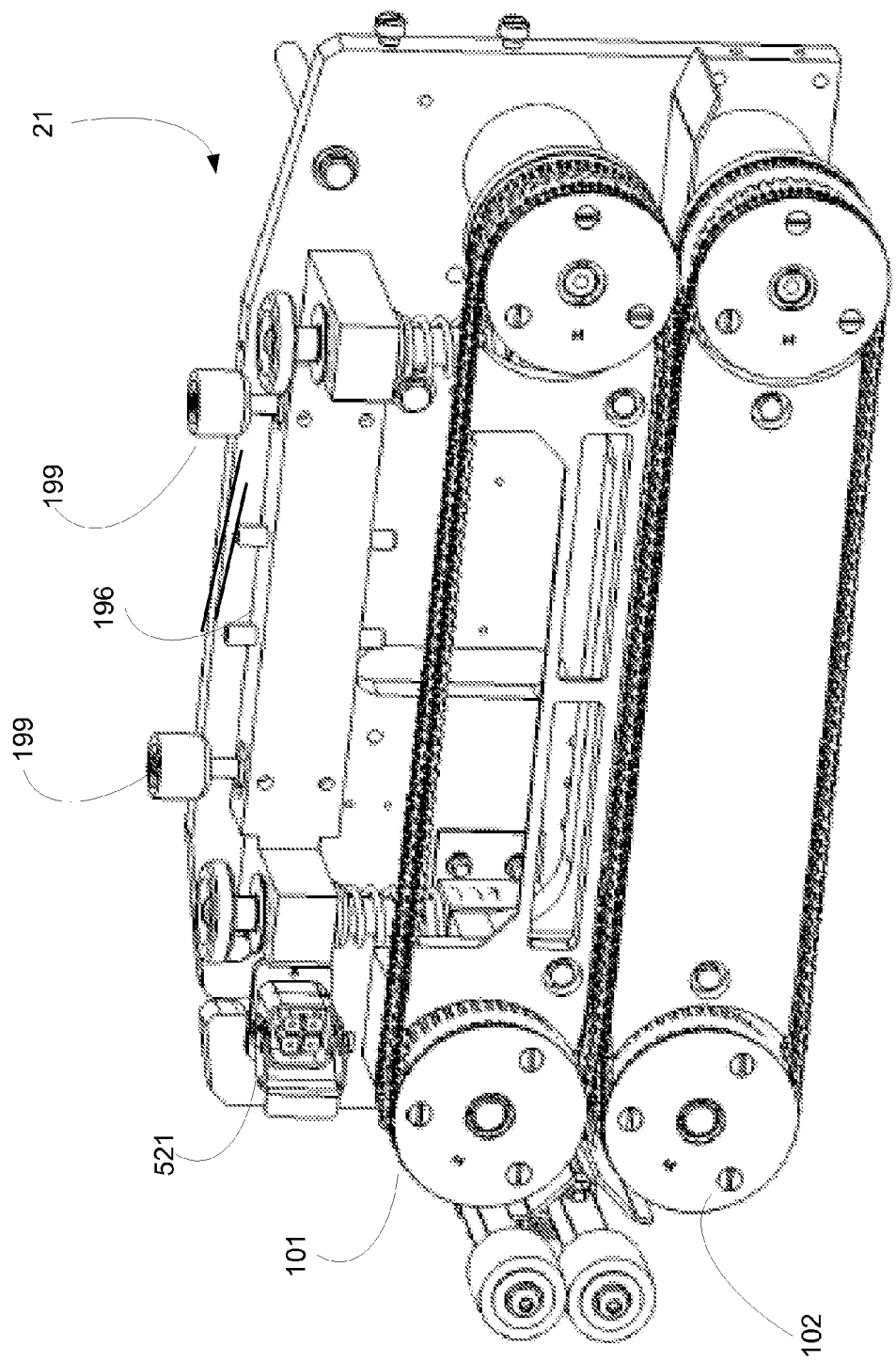
FIG. 10 illustrates a side sealing mechanism without a heating/sealing/cutting assembly installed.

As described above, the side sealing mechanism 20 includes two portions, a modular heating/sealing/cutting assembly 500, and a universal side mechanism 21. FIG. 10 shows the universal side mechanism 21, which is the side sealing mechanism 20 without a heating/sealing/cutting assembly installed. The universal side mechanism 21 includes two sets of cooperating pulleys, an upper set 101 and a lower set 102.

In addition, the universal side mechanism 21 has a mounting mechanism, designed to cooperate with the mounting mechanism on the heating/sealing/cutting assembly 500. In this embodiment, the mounting mechanism includes a mounting platform 196. The mounting bracket 502 of the heating/sealing/cutting assembly 500 is intended to rest on this mounting platform 196. In addition, in this embodiment, the connecting elements comprise two spring loaded captive members 199. To install a modular heating/sealing/cutting assembly, the members are pulled upward such that the mounting ports 501 can be slid in place under the head of the captive members 199. The universal side mechanism 21 may also include the distal end of the power connector 521, which mates with power connector 520. In addition, the universal side mechanism 21 may also include a receptacle for the feedback connector 530 (not shown) and a receptacle for the air duct 510 (not shown). In other embodiments, the various connectors may not be located on the universal side mechanism 21, and may instead originate at other locations on the side sealing machine 10.

FIG. 10 shows a mounting platform 196 on which the heating/sealing/cutting assembly 500 rests. However, other attachment mechanisms are also within the scope of the invention. For example, the universal side mechanism 21 may have a receptacle into which the heating/sealing/cutting assembly 500 is inserted. Such a receptacle may provide both the mechanical connection and stability, as well as the electrical contacts. Another methods of connecting the universal side mechanism 21 and the heating/sealing/cutting assembly 500 are also possible and within the scope of the invention. Thus, the term "mounting mechanism" is used to denote not only the mounting platform and mounting bracket shown in the figures, but other mounting configurations as well.

Figure 6A:
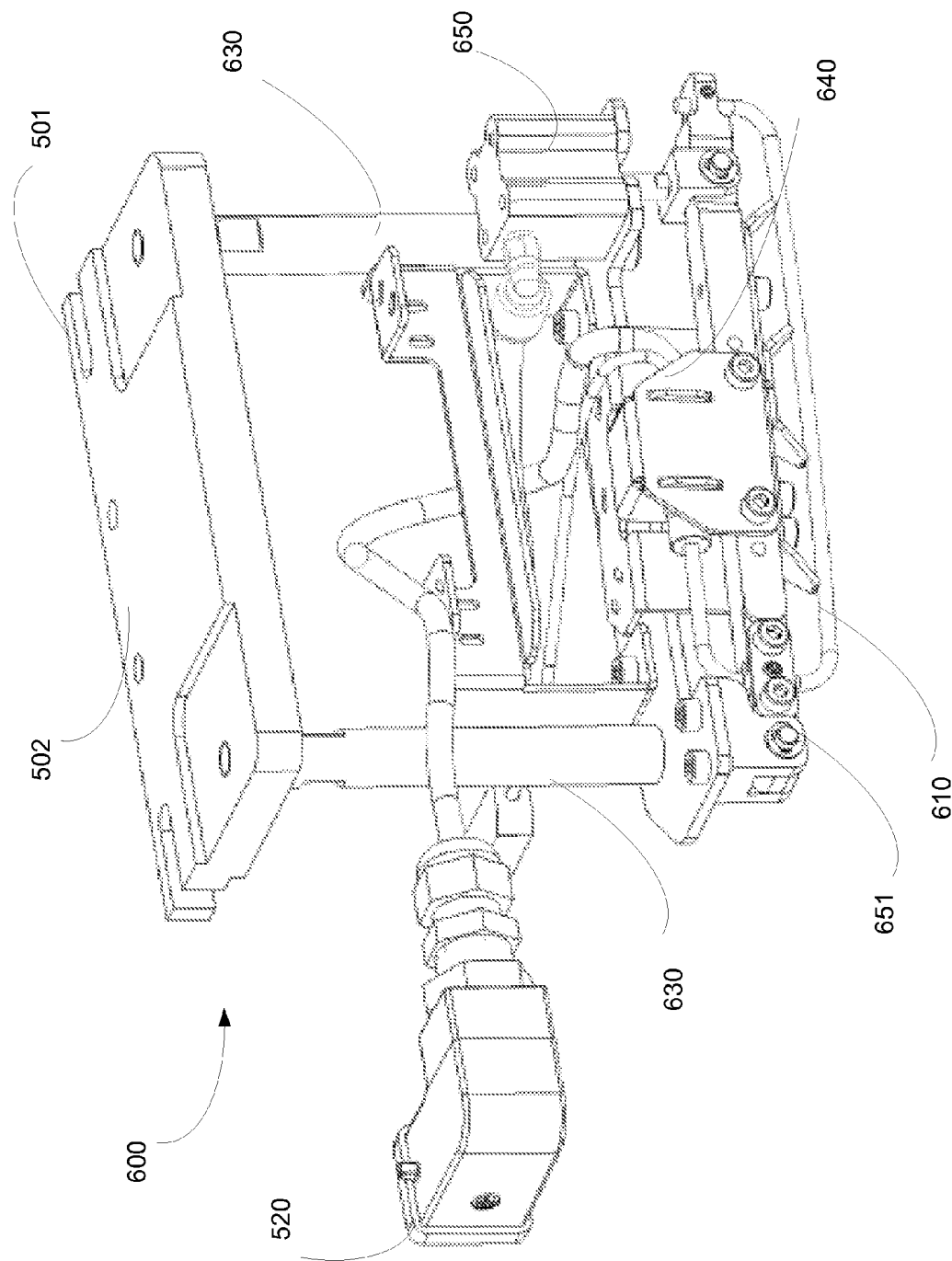
FIG. 6A illustrates a front view of an embodiment including a tubular heating assembly and the adjustable platform.
Figure 6B:
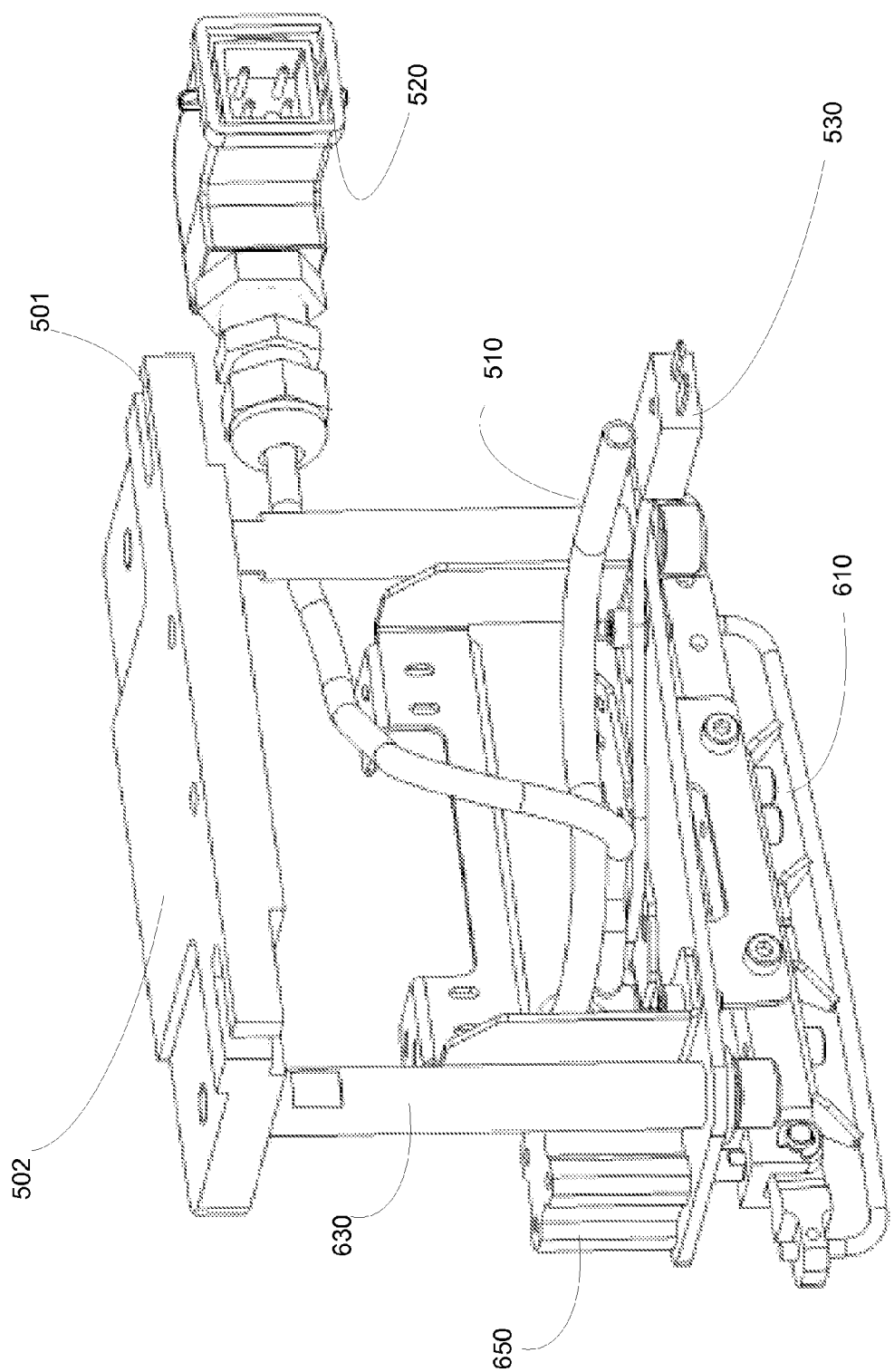
FIG. 6B illustrates a rear view of an embodiment including a tubular heating assembly and the adjustable platform.

FIG. 6A shows a front view of a modular heating/sealing/cutting assembly 600 using a tubular heating element, while FIG. 6B shows a rear view. This heating/sealing/cutting assembly 600 may also be used with the universal side mechanism 21 shown in FIG. 10. The assembly 600 may have a round tube 610, which is made of a metal, such as stainless steel. The tube 610 is heated through the application of power to the tube. This power may be a constant voltage and a variable current. In other embodiments, this power is a variable voltage. In yet other embodiments, a digital value is passed to the tube, which represents the power to be used. The power from the sealing machine 10 passes to the tube via power connector 520.

The heating tube 610 is suspended from mounting bracket 502, using extension brackets 630. As described above, mounting ports 501 are located on the mounting bracket 502. The length of extension brackets 630 is determined so that the heating tube 610 contacts the film when attached to the mounting platform 196 on the universal side mechanism 21 (see FIG. 10). As stated above, other methods of attaching the heating/sealing/cutting assembly 600 to the universal side mechanism 21 may also be used. The intent is that the same mounting mechanism is used for all variations of heating/sealing/cutting assemblies, regardless of the technology that they employ.

A temperature sensing probe 640 is located near the heated tube 610, so as measure the temperature at or near the tube 610. In some embodiments, the output from the temperature sensing probe 640 is coupled to the universal side mechanism 21 via feedback connector 530. In other embodiments, the feedback connector originates from a different location on the sealing machine 10. In some embodiments, an internal thermocouple is used rather than a temperature sensing probe.

In some embodiments, such as shown in FIGS. 6A and 6B, the heated tube 610 may be connected to an air cylinder 650. The air cylinder allows the tube 610 to be pushed downward toward the film, or pulled away from the film. In some embodiments, the heated tube is attached to extension members 630 which push the tube 610 downward. In other embodiments, one side of the tube 610 is hinged, while the other side is attached to the air cylinder 650. The air cylinder causes the tube 610 to pivot about this hinge 651. In other embodiments, the tube 610 is rigidly attached to the extension brackets 530 and cannot be moved relative to the film.

In those embodiments that utilize an air cylinder 650, air is introduced to the cylinder 650 via air duct 510. In other embodiments, air duct 510 is not necessary and is not used. The air duct may be located on the universal side mechanism 21 or at a different location on the sealing machine 10.

Note that both assemblies 500, 600 utilize the same mounting mechanisms. In these embodiments, that mounting mechanism includes mounting ports 501, mounting bracket 502, power connector 520, feedback connector 530 and air duct 510. This allows either to be attached to the same universal side mechanism 21, with no other hardware modifications.

Although only heating cutting blades and tubular heaters are described, other technologies may also be utilized in this invention. For example, a technology, such as lasers, may be used to heat, seal and cut film. In such an embodiment, the laser may be mounted to the mounting bracket 502, as described above. Power is supplied to the laser using power connector 520. In such an embodiment, temperature feedback may be unnecessary and no feedback may be necessary. In another embodiment, the feedback may be optical in nature. For example, an optical sensor may be used to insure that a film is beneath the laser before enabling the laser beam. Since the laser is capable of cutting the film without being in contact with it, it is likely that the air cylinder and the air duct 510 are not used in this embodiment.

In yet another embodiment, a technology utilizing a heated wire may be used as the heating/sealing/cutting element. In this embodiment, the power connection is used to supply power to the wire in order to heat it. As is traditional with hot wire systems, the feedback mechanism may consist of a proximity sensor, which measures the length of the heated wire, and thereby indirectly measures its temperature. Thus, rather than provide temperature information, the data returned via the feedback connector 530 may provide length information to the controller.

Thus, heating/sealing/cutting assemblies may be made using a variety of technologies, including those which may not be currently available.

The use of standardized connections in the form of power connections 520, feedback connector 530 and air duct 510, in conjunction with a uniform mechanical mounting system, such as one utilizing mounting bracket 502, mounting ports 501, mounting platform 196 and connecting elements 199 allow heating/sealing/cutting assemblies of different technologies to be interchanged easily on the universal side mechanism 21.

In addition to uniform mechanical connections, the present invention also includes a controller adapted to control the various heating/sealing/cutting assemblies. Each of these heating/sealing/cutting assemblies operates somewhat differently. For example, the heated cutting blade assembly 400 has a large thermal capacity and therefore responds slowly to changes in applied power. It also responds more slowly to heat loss due to moving film. The tubular heater 610, on the other hand, has a much smaller thermal capacity and therefore responds much more quickly to heat losses caused by the film, and also to heat increases caused by applied power. Similar, hot wire and laser technologies have unique characteristics. For example, a laser may be completely insensitive to the speed of the film and has nearly instantaneous response to changes in power level. Therefore, a controller adapted to control these various mechanisms is also provided.

Figure 7:
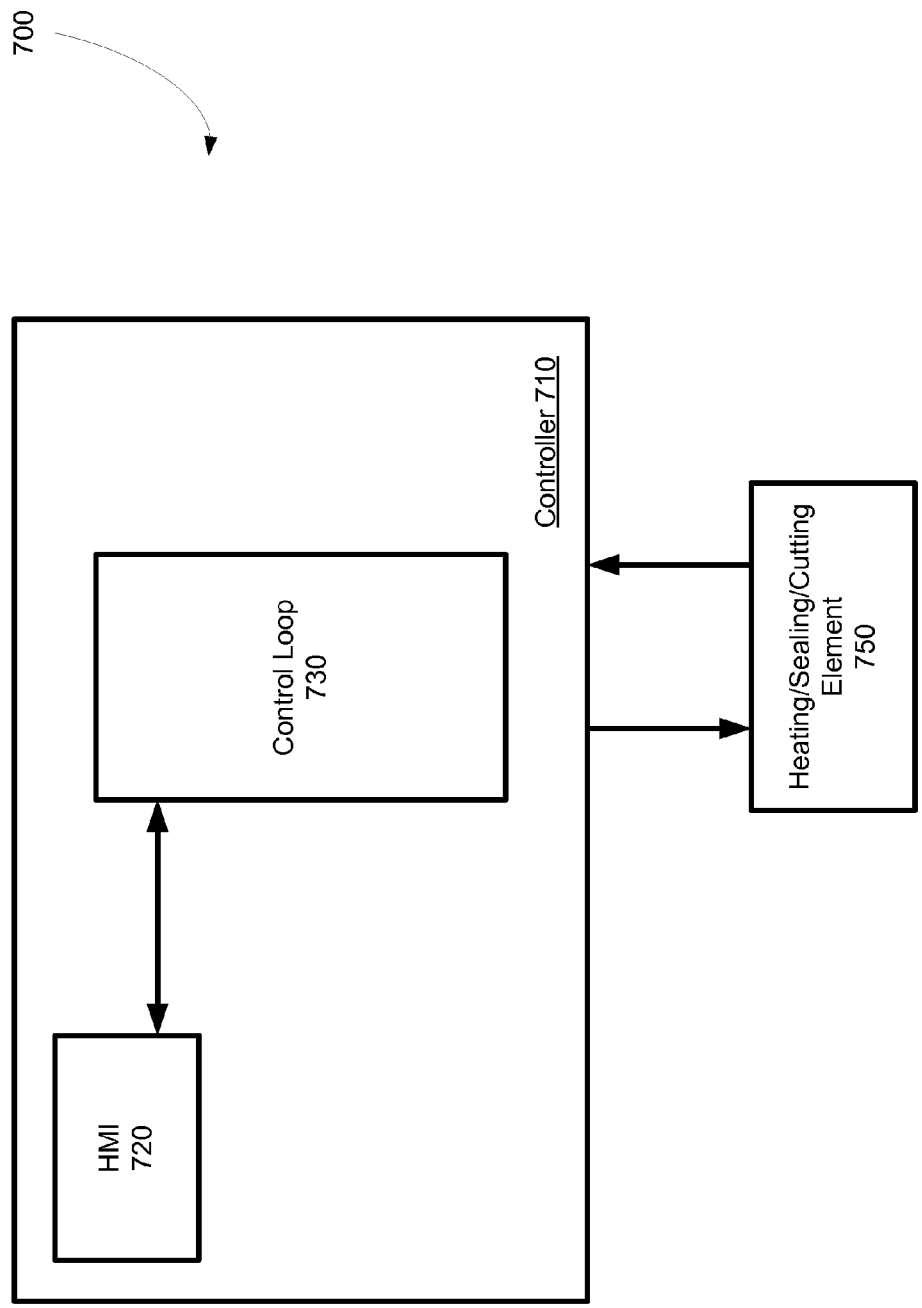
FIG. 7 illustrates a first embodiment of a control system.

FIG. 7 shows a first embodiment of a control system 700 that can be used. The control system 700 includes a controller 710 and the heating/sealing/cutting element 750. The controller 710 consists of a processing unit, such as a microprocessor, PLC, embedded processor or other suitable device. The controller 710 also includes a memory element adapted to store the instructions that are executed by the processing unit. In addition, the memory element may contain volatile data as required. The memory element may be a semiconductor memory device, such as RAM, EEPROM, FLASH ROM, DRAM or other technologies. It may also include magnetic or optical storage, such as disk drives, CDROMs, or DVDs.

In this embodiment, the controller 710 includes a HMI (human machine interface) 720, to allow the operator to enter certain parameters about the process, such as film thickness, film speed, and other parameters. The HMI 720 may be a touchscreen, toggle switches, keypad or other suitable input/output device. One of the options presented to the operator is selection of the heating/sealing/cutting element being used. Using this information, the controller 710 may determine the appropriate parameters, such as temperature, for the heating/sealing/cutting element 750 and use these parameters to the control loop 730. In this embodiment, the controller also performs the control loop and as such, has various profiles embedded in its memory element, such that it can control multiple heating mechanisms, once informed of the selection by the HMI 710. The control loop 730 then executes its control loop, using parameters specific to the selected heating/sealing/cutting element 750.

Note that in other embodiments, the heating/sealing/cutting element 750 may have a "plug and play" interface, such that the controller 710 recognizes the type of element 750 immediately when the element is attached to the sealing machine. This can be accomplished using pre-programmed jumpers, a DeviceNet connector, or other intelligent interface, such as USB. In addition, the type of element may be encoded in a bar code or RFID tag which is read by the sealing machine 10. This eliminates the need for the operator to enter the type of element 750 being used. Other mechanisms for automatic detection may also be used.

Figure 8:
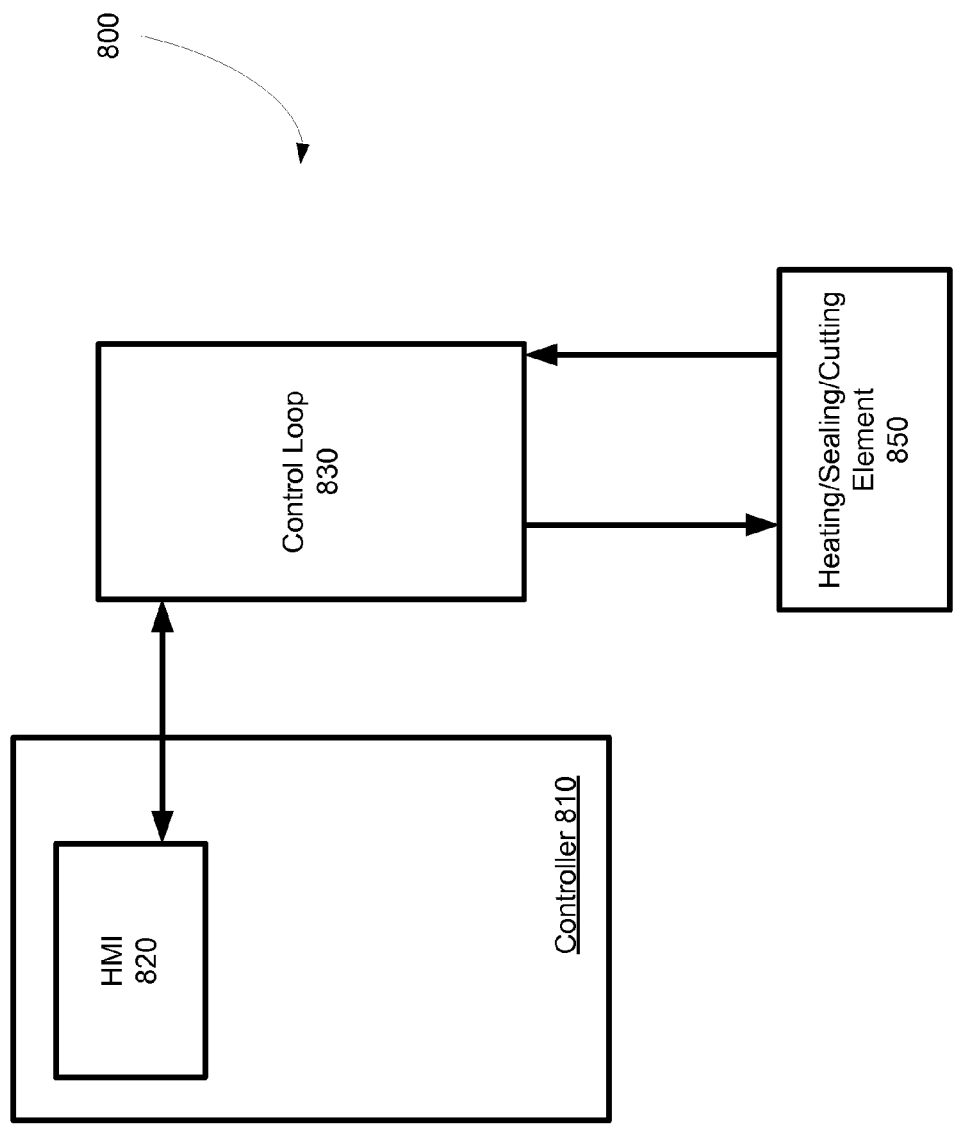
FIG. 8 illustrates a second embodiment of a control system.

FIG. 8 shows a second embodiment of a control system 800 that can be used. The control system 700 includes a controller 810 and the heating/sealing/cutting element 850. The controller 810 consists of a processing unit, such as a microprocessor, PLC, embedded processor or other suitable device. The controller 810 also includes a memory element adapted to store the instructions which are executed by the processing unit. In addition, the memory element may contain volatile data as required. The memory element may be a semiconductor memory device, such as RAM, EEPROM, FLASH ROM, DRAM or other technologies. It may also include magnetic or optical storage, such as disk drives, CDROMs, or DVDs.

In this embodiment, the controller 810 includes a HMI (human machine interface) 820, to allow the operator to enter certain parameters about the process, such as film thickness, film speed, and other parameters. The HMI 820 may be a touchscreen, toggle switches, keypad or other suitable input/output device. One of the options presented to the operator is selection of the heating/sealing/cutting element being used. The HMI 820 informs the control loop 830 of this selection.

In this embodiment, the control loop 830 is separate from the controller 810 and the HMI 820. Using this information, the controller 810 may determine the appropriate parameters, such as temperature, for the heating/sealing/cutting element 850 and supply these parameters to the control loop 830.

The control loop 830 may be a PLC or a dedicated PID controller. In one embodiment, the control loop 830 has a dedicated memory element and has various profiles embedded in its memory element, such that it can control multiple heating mechanisms, once informed of the selection by the HMI 810. The control loop 830 then executes its control loop, using parameters specific to the selected heating/sealing/cutting element 850.

In another embodiment, the controller 810 supplies the required parameters to the control loop 830. In this embodiment, the control loop may be a generic PID controller, where the operating parameters are supplied by controller 810. Once the parameters are supplied by the controller 810, the control loop 830 monitors and controls the temperature of the heating/sealing/cutting element 850.

Thus, in the embodiments of FIG. 7 and FIG. 8, the control system has a set of instructions which are adapted to monitor and control the temperature of the heating/sealing/cutting element. These instructions may be within the controller 710 or a separate control loop 830. In addition, the control systems have a set of operating parameters associated with each type of heating/sealing/cutting element. Once the input indicating which type of a heating/sealing/cutting element is attached to the sealing machine 10, the control system uses the appropriate set of parameters with this set of instructions to regulate the temperature of the element and thereby control the quality of the seal.

Figure 9:
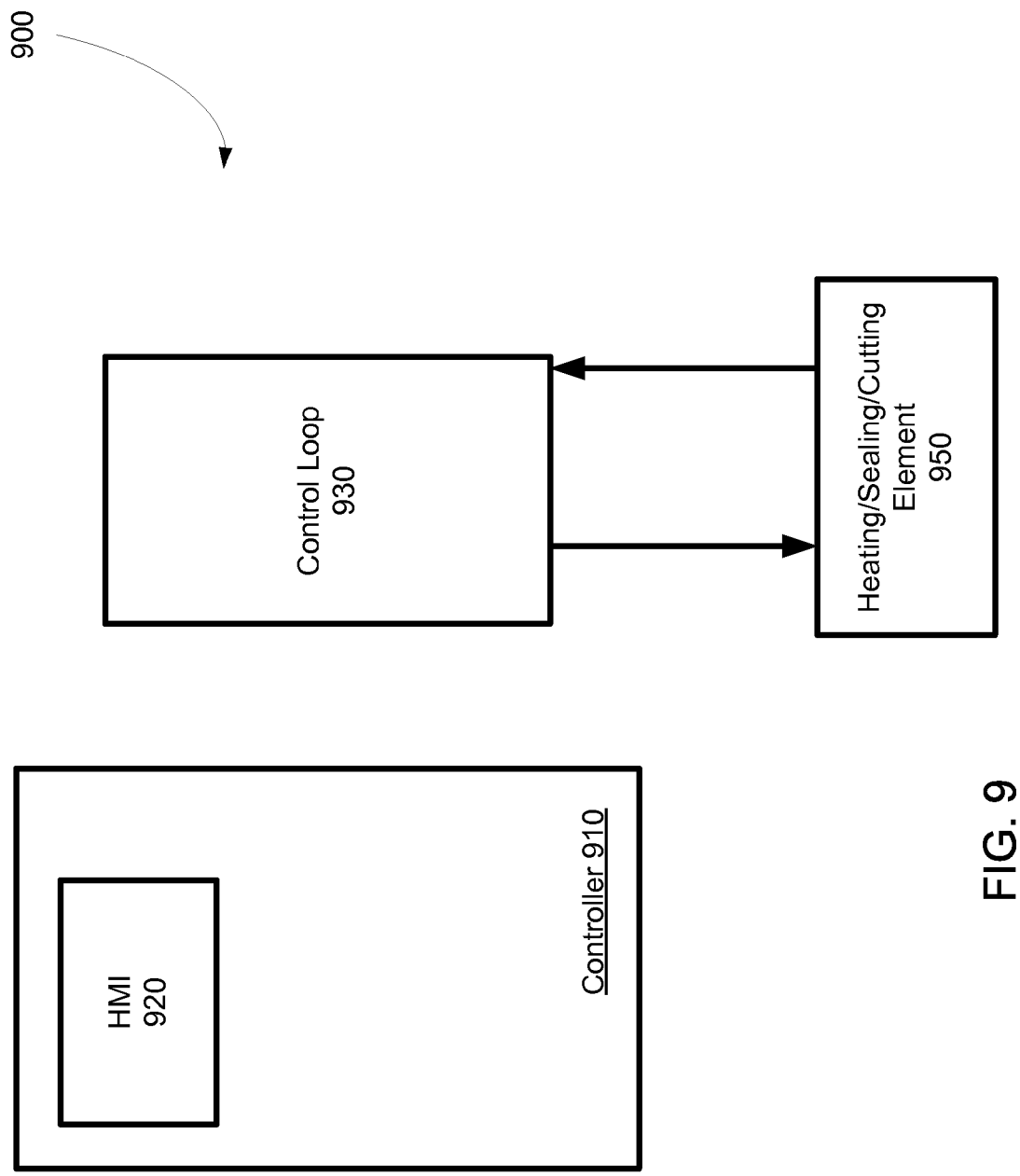
FIG. 9 illustrates a third embodiment of a control system.

FIG. 9 shows a third embodiment of a control system 900 that can be used. In this embodiment, the control system 900 includes a controller 910, a control loop 930 and the heating/sealing/cutting element 950. The controller 910 consists of a processing unit, such as a microprocessor, PLC, embedded processor or other suitable device. The controller 910 also includes a memory element adapted to store the instructions which are executed by the processing unit. In addition, the memory element may contain volatile data as required. The memory element may be a semiconductor memory device, such as RAM, EEPROM, FLASH ROM, DRAM or other technologies. It may also include magnetic or optical storage, such as disk drives, CDROMs, or DVDs.

In this embodiment, the controller 910 includes a HMI (human machine interface) 920, to allow the operator to enter certain parameters about the process, such as film thickness, film speed, and other parameters. The HMI 920 may be a touchscreen, toggle switches, keypad or other suitable input/output device.

In this embodiment, the control loop 930 is completely separate from the controller 910 and the HMI 920. For example, the control loop 930 may be a dedicated circuit board, which is easily inserted and removed from the sealing machine 10. In one embodiment, this control loop 930 has various instantiations, each having a profile embedded in its memory element, such that each instantiation can control a particular heating mechanism. To select between the various heating elements 950, the operator inserts the circuit board containing the appropriate control loop 930 into the sealing machine 10. The control loop 930 then executes its control loop, using parameters specific to the selected heating/sealing/cutting element 950. In this embodiment, the control loop 930 may have a dedicated HMI to allow the operator to manually enter the desired temperature.

Thus, an operator may utilize various technologies on a single side sealing machine 10 to insure the highest quality seal. In one embodiment, the operator selects the optimal technology to use for a certain film thickness, film composition and film speed. As described above, it may be that tubular heaters are preferred for thicker films and/or films moving at high speed, while heating cutting blades may be preferable for other configurations. In some embodiments, a hot wire system, or even a laser based system may be preferable. Once the operator selects a technology, the operator then mounts the selected modular heating/sealing/cutting assembly to the universal side mechanism 21. The operator may first mechanically attach the assembly, using the connecting elements. The operator may then connect the various connectors, including the power connector and the feedback connector. In some embodiments, an air duct is also attached. The operator then indicates the choice of the side sealing technology to the machine. This may be done using a HMI, as described above. In other embodiments, the choice may be automatically determined by the machine, such as through an intelligent plug and play interface, such as USB or DeviceNet, a jumper, a bar code, RFID tag or another identification system. The machine, knowing the technology being used, then loads the appropriate parameters into the control loop. The control loop then executes a set of instructions adapted to monitor and control the quality of seals produced. This may be done by monitoring temperature of the heating element (such as for heated cutting blades or tubular heaters), the length of the heating element (such as for hot wire systems), or other means.

While the disclosure describes the control system as monitoring and controlling the temperature of the heating/sealing/cutting element, it is recognized that the control system is actually concerned with the creation of acceptable seals. Toward this end, in most instances, temperature is used as a way of guaranteeing the quality of the seal. However, it should be realized that temperature is not necessarily the only way that can be used to monitor seal quality. For example, if a hot wire is used, wire length may be monitored and controlled. If a laser is used, other characteristics may be monitored and controlled.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A side sealing machine adapted to support a plurality of modular heating/sealing/cutting mechanisms for sealing a film, comprising:
   a universal side mechanism, comprising:
     opposing sets of pulleys and belts to guide said film toward a modular heating/sealing/cutting assembly; and
     a mounting mechanism, adapted to hold said modular heating/sealing/cutting assembly;
   a power connector for supplying power to said modular heating/sealing/cutting assembly;

a feedback connector for receiving feedback information from said modular heating/sealing/cutting assembly;

the universal side mechanism configured to be operatively connected with either of:
  a) a first modular heating/sealing/cutting assembly, adapted to heat, seal and cut said film, comprising:
    a mounting mechanism, adapted to cooperate with said mounting mechanism on said universal side mechanism, wherein said mounting mechanism utilizes a common interface across mounting mechanisms on a plurality of modular heating/sealing/cutting assemblies;
    a power input, adapted to be connected to said power connector;
    a feedback output, adapted to be connected to said feedback connector; and
    a first heating/sealing/cutting element utilizing a first technology; or
  b) a second modular heating/sealing/cutting assembly, adapted to heat, seal and cut said film, comprising:
    a mounting mechanism, adapted to cooperate with said mounting mechanism on said universal side mechanism, wherein said mounting mechanism utilizes a common interface across mounting mechanisms on said plurality of modular heating/sealing/cutting assemblies;
    a power input, adapted to be connected to said power connector;
    a feedback output, adapted to be connected to said feedback connector; and
    a second heating/sealing/cutting element utilizing a second technology, different than said first technology.

2. The side sealing machine of claim 1, wherein said first heating/sealing/cutting element comprises a heated cutting blade and said second heating/sealing/cutting element comprises a tubular heater.

3. The side sealing machine of claim 1, wherein said mounting mechanism on said universal side mechanism comprises a mounting platform, and said mounting mechanism on said first and second modular heating/sealing/cutting assemblies comprises a mounting bracket.

4. The side sealing machine of claim 3, further comprising connecting elements to couple said mounting bracket and said mounting platform.

5. The side sealing machine of claim 1, wherein said mounting mechanism on said universal side mechanism comprises a receptacle adapted to hold said first and second modular heating/sealing/cutting assemblies.

6. The side sealing machine of claim 1, wherein said power connector is located on said universal side mechanism.

7. The side sealing machine of claim 1, wherein said feedback connector is located on said universal side mechanism.

8. The side sealing machine of claim 1, further comprising an air connector for supplying air to said modular heating/sealing/cutting assembly, wherein said first and second modular heating/sealing/cutting assemblies further comprise an air input for receiving air from said air connector.

9. A side sealing machine adapted to support a plurality of modular heating/sealing/cutting mechanisms for sealing a film, comprising:
  a universal side mechanism, comprising:
    opposing sets of pulleys and belts to guide said film toward a modular heating/sealing/cutting assembly; and
    a mounting mechanism adapted to hold said modular heating/sealing/cutting assembly;
  a power connector for supplying power to said modular heating/sealing/cutting assembly;
  a feedback connector for receiving feedback information from said modular heating/sealing/cutting assembly;
  a first modular heating/sealing/cutting assembly, adapted to heat, seal and cut said film, comprising:
    a mounting mechanism, adapted to cooperate with said mounting mechanism on said universal side mechanism, wherein said mounting mechanism utilizes a common interface across mounting mechanisms on a plurality of modular heating/sealing/cutting assemblies;
    a power input, adapted to be connected to said power connector;
    a feedback output, adapted to be connected to said feedback connector; and
    a first heating/sealing/cutting element utilizing a first technology; and
  a control system, comprising:
    means to receive an input indicating a first technology,
    a set of instructions adapted to monitor and control the quality of seals produced by the heating/sealing/cutting element;
    a first set of parameters associated with said first technology;
    a second set of parameters associated with a second technology;
    wherein said control system executes instructions using said first set after receipt of said input.

10. The side sealing machine of claim 9, wherein said first heating/sealing/cutting element comprises a heated cutting blade and said second technology comprises tubular heaters.

11. The side sealing machine of claim 9, wherein said means to receive an input is selected from the group consisting of a human machine interface, a jumper, a barcode, an RFID tag, and an intelligent interface.

12. The side sealing machine of claim 9, wherein said set of instructions comprises a PID control loop.

* * * * *